United States Patent
Zirps

[15] 3,657,888
[45] Apr. 25, 1972

[54] HYDRAULIC POWER STEERING APPARATUS
[72] Inventor: Wilhelm Zirps, Hemmingen, Germany
[73] Assignee: Robert Bosch GmbH, Stuttgart, Germany
[22] Filed: Jan. 28, 1971
[21] Appl. No.: 110,414

[30] Foreign Application Priority Data
Feb. 6, 1970 Germany ...................P 20 05 404.0

[52] U.S. Cl. ..............................................60/52 S, 180/79.2
[51] Int. Cl. .............................................................F15b 15/18
[58] Field of Search ...................................60/52 S; 180/79.2

[56] References Cited
UNITED STATES PATENTS
2,954,756 10/1960 Donner et al. ......................60/52 S X
3,014,548 12/1961 Donner et al. ......................60/52 S X
3,016,708 1/1962 Gordon et al. ..........................60/52 S Primary Examiner—Edgar W. Geoghegan
Attorney—Michael S. Striker

[57] ABSTRACT

A hydraulic power steering apparatus has a piston pump operated by a steering wheel and shifting at an increased resistance, a control valve for connecting a motor driven power pump to a steering motor acting on the wheels of a car. An auxiliary motor is also connected to the wheels, and participates in normal steering operations, but when the wheels are jolted by the road surface, the increased pressure in the auxiliary motor effects shifting of a valve and thereby supply of pressure fluid from the power pump to the auxiliary motor for damping or compensating the jolt.

10 Claims, 2 Drawing Figures

3,657,888

HYDRAULIC POWER STEERING APPARATUS

BACKGROUND OF THE INVENTION

The present invention relates to a fully hydraulic power steering apparatus, particularly for motor cars, of the type including a control pump operated by the steering wheel, and adapted to be manually operated when the power pump fails, or the resistance against a steering maneuver is small. When the resistance increases, a steering motor is connected with the power pump, and boosts the force acting on the wheels.

The German Auslegeschrift 1,505,493 discloses a power steering apparatus of this type which has a cylinder and piston pump operated by the steering wheel. The arrangement requires a great deal of space near the driver's seat, and is expensive to manufacture.

The U.S. Pat. No. 3,016,708 discloses hydraulic steering apparatus in which a vane pump is operated by the steering wheel. Two separate hydraulic circuits are required, namely a control circuit and a power circuit. The control circuit is constructed as a low pressure circuit which performs the function of the high pressure circuit only when the power pump fails. The apparatus has the disadvantage that the steering cylinder is comparatively large, and that an auxiliary cylinder in the low pressure hydraulic circuit must be of corresponding size to assure the possibility of steering the car when the power pump fails.

SUMMARY OF THE INVENTION

It is one object of the invention to provide a hydraulic power steering apparatus which can be used for all types of cars and vehicles, independent of the type of control pump operated by the steering wheel.

Another object of the invention is to provide a compact and efficient power steering apparatus in which a small steering motor can be used independently of the size of the car.

Another object of the invention is to provide a hydraulic power steering apparatus with an auxiliary hydraulic motor by which jolts acting on the wheels of the car, are compensated or at least damped.

Another object of the invention is to provide a hydraulic power steering apparatus with an auxiliary motor participating in the steering operations of the steering motor.

With these objects in view, the present invention provides a valve means responsive to pressure variations, and controlling the flow of pressure fluid to and from an auxiliary motor which is connected with the steering linkage to follow the movements of the steering motor.

If the apparatus of the invention is to be combined with an existant power steering apparatus, it is advantageous to provide a control valve for controlling the steering motor, and an auxiliary valve for controlling the auxiliary motor.

If a very compact power steering apparatus is desired, which has very few connecting conduits, it is advantageous to provide a single control valve having ports and channels for performing the functions of controlling the steering motor, as well as the auxiliary motor.

An embodiment of the invention comprises manually operated steering means including a control pump having two simultaneously expanding and contracting control chambers; motor driven power pump means; control valve means having a neutral position, and two operative positions associated with steering to the right and left; control conduit means connecting the control chambers with the control valve means; pressure and return conduit means connecting the power pump with the control valve means; a hydraulic steering motor including a first movable member and two first steering chambers simultaneously expanding and contracting during movement of the first movable member; a steered element connected with the first movable member; steering conduit means connecting the first steering chambers with the control valve means so that manual operation of the steering means effects operation of the steering motor in the neutral position of the control valve means; shifting means connected with the control conduit means for shifting the control valve means from the neutral position to one or the other of the operative positions when the pressure in the respective control chamber increases, the control valve means connecting in the two operative positions the pressure and return conduit means with the steering conduit means and said first steering chambers for power-operating the steering motor; a hydraulic auxiliary motor including a second movable member forming two second steering chambers and being connected with the steered element and with the first movable member for movement with the same so that the first and second movable members move together when the steering element is jolted in one direction in the neutral position of the control valve means; and auxiliary conduit means connecting the control valve means with the second steering chambers.

The arrangement is such, that when a pair of first and second steering chambers is contracted by a jolt on the steering element, the shifting means receive pressure fluid from one steering chamber of said pair of contracted first and second steering chambers for shifting the control valve means to one of the two operative positions for supplying pressure fluid from the pressure conduit means at least to the second steering chamber of said pair for urging the second movable member of the auxiliary motor to move with the steered element opposite to the direction of the jolt.

In one embodiment of the invention, the control valve means include a control valve and an auxiliary valve, and the control valve mainly controls the steering motor, while the auxiliary valve mainly controls the auxiliary motor.

In another embodiment of the invention, a single control valve means is provided which has ports and channels for controlling the steering motor as well as the auxiliary motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
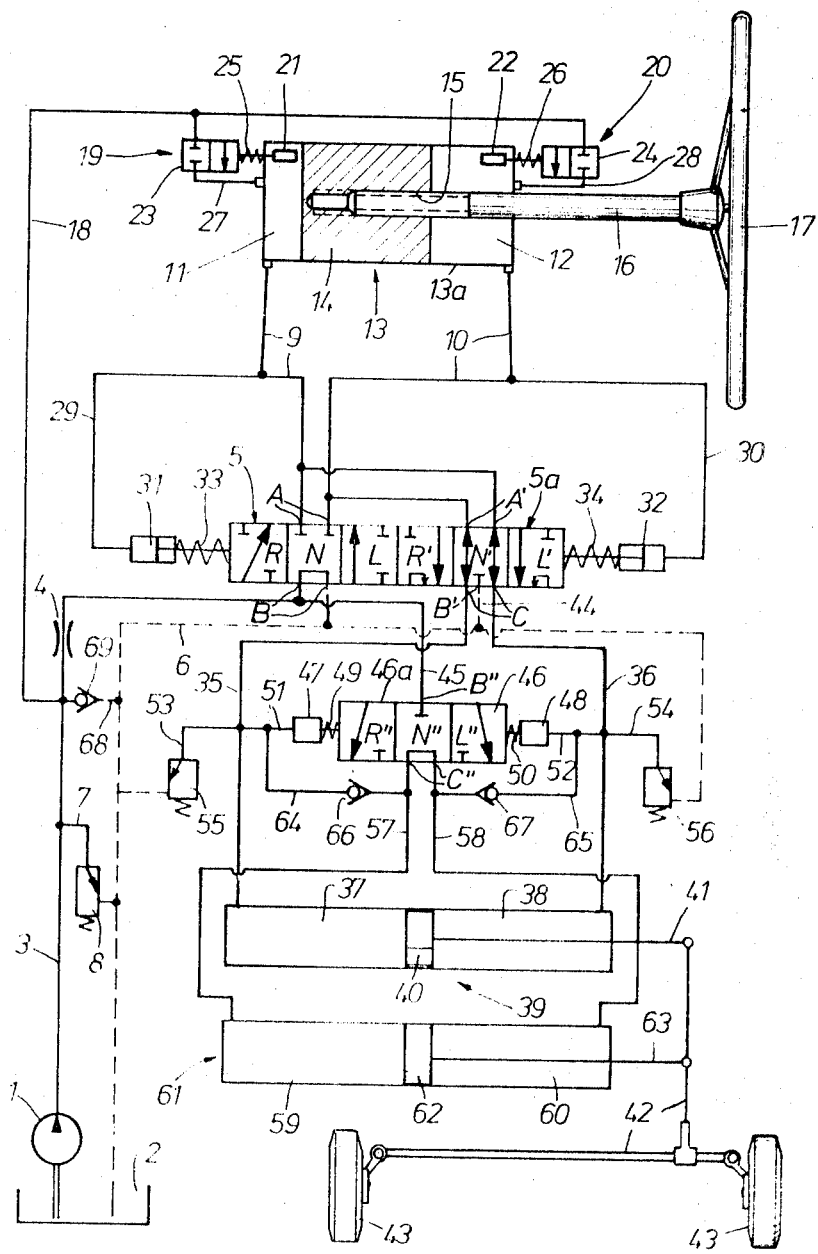
FIG. 1 is a schematic view of a first embodiment of the invention, including a diagram illustrating the hydraulic circuit.

Referring first to the embodiment of FIG. 1, a motor driven power pump 1 pumps a pressure fluid out of a container 2 into a pressure conduit 3 which has a throttle 4. A return conduit 6 discharges fluid into the container 2, and is connected with pressure conduit 3 by a safety valve 8. A control valve 5 has two stationary ports B connected with the pressure conduit 3 and return conduit 6. The return conduit 6 is also connected with another port B'. Two other pairs of ports A and A' are connected with two control conduits 9 and 10 which open into the control chambers 11 and 12 of a control pump 13 which includes a cylinder 13a in which a piston 14 is mounted for reciprocating movement to simultaneously contract and expand the control chambers 11 and 12, depending on the direction of movement of piston 14. Piston 14 has a threaded bore 15 into which a threaded spindle 16 projects so that turning of spindle 16 by steering wheel 17 causes displacement of piston 14 in cylinder 13a depending on the direction of the turning of steering wheel 7. For example, movement of piston 14 to the left as viewed in FIG. 1, will cause contraction of chamber 11 and flow of fluid through control conduit 9 to one of the ports A, while the expanding control chamber 12 will suck fluid through control conduit 10 and from the other port A, if permitted by the position of valve 5.

Upstream of the throttle 4, a pressure conduit portion 18 branches off pressure conduit 4, and is connected to two balancing valves 19 and 20 which have plungers 21 and 22 projecting into the control chambers 11 and 12, respectively. The other ends of plungers 21, 22 are connected with a valve slide 23 or 24 biassed by a spring 25 or 26 which urges the respective plunger to an end position in which the plunger end 21 or 22 projects farthest into the respective control chamber 11 or 12. Slide 23, 24 closes in this end position the pressure conduit portion 18 so that no pressure fluid can flow through conduit 27 or 28 into control chamber 11 or 12.

When control piston 14 moves to one of its end positions, piston 14 engages the plunger 21 or 22 against the force of spring 25 or 26 out of control chamber 11 or 12 and thereby shifts the valve slide 23 or 24 to its other end position in which the pressure conduit portion 18 is connected with conduits 27 or 28 and thereby with control chamber 11 or 12 so that the latter are directly supplied with pressure fluid from the power pump 1. Due to the provision of the valve 23, 24, displacements of control piston 14 relative to the steering piston 40, which may occur due to leakage, are corrected. Furthermore, due to the supply of pressure fluid to one control chamber, the immediate response of the auxiliary piston 62 upon a return movement of control piston 14 is obtained. The functions of steering piston 40 and auxiliary piston 62 will be explained hereinafter in greater detail, but it may be noted that these pistons are both connected to a linkage 42 which controls the link connecting the front wheels 43 of a motor car.

The control conduits 9 and 10 are connected with control conduits 29 and 30 opening in chambers of hydraulic shifting means 31 and 32. Control valve 5 has a schematically illustrated valve slide which is movable between a neutral position, and two operative positions cooperating with the stationary ports A, A', which are connected with the control conduts 9 and 10, with the stationary ports B which are connected with the pressure conduit 3 and the return conduit 6, the stationary ports C which are connected with steering conduits 35 and 36, and the stationary port B' which is connected with the return conduit 6.

The steering conduits 35 and 36 are connected with steering chambers 37 and 38 on opposite sides of the steering piston 40 whose piston rod 41 is connected with the steering linkage 42. When pressure fluid is supplied to one of the steering chambers 37, 38, the piston moves in the cylinder of the steering motor 39 to turn the wheels 43. The valve slide 5a of control valve 5 has channels and grooves cooperating with the stationary ports to obtain different connections between the respective conduits in the neutral position, illustrated in FIG. 1, and in the two operative positions associated with steering to the right and left. In the schematic illustration of FIG. 1, the diagrammatically illustrated connections shown at N and N' are effective in the neutral position of valve slide 5a, the diagrammatic connections R and R' are effective when the valve slide 5a is shifted to the right as viewed in FIG. 1, and the diagrammatic connections L and L' are effective if valve slide 5a is shifted to the left as viewed in FIG. 1. Springs 33 and 34 act in opposite directions on valve slide 5a to hold the same in the neutral middle position, but valve slide 5a can be shifted by shifting means 32 to the left, and by shifting means 31 to the right.

In the neutral position illustrated in FIG. 1, the connections N and N' are effective so that the connections N connect the stationary ports B, and thereby pressure conduit 3 and return conduit 6 with each other. Control conduits 9 and 10 are closed since the ports A are not connected with a channel in valve slide 5a. The ports A' of control conduits 9 and 10 are connected by the connections N' with the ports C of the steering conduits 35 and 36. The port B' of conduit 44 which is connected with return conduit 6, is disconnected.

When valve slide 5a is shifted to the left by shifting means 32 as will be explained hereinafter, the connections schematically illustrated at L and L' are effective. Pressure conduit 3 is connected by its port B with control conduit 9, while port B of return conduit 6 is disconnected as shown at L', the port A' of control conduit 10, is connected with the port C of steering conduit 35, while the port A' of control conduit 9 is disconnected. The steering conduit 36 is connected with port B' of conduit 44 which communicates with return conduit 6.

In the right end position of control valve slide 5a, the connections indicated at R and R' are effective, so that the control conduit 9 is connected only with steering conduit 36 which leads to the steering chamber 38, while the pressure conduit 3 is connected with the control conduit 10 which is disconnected from the steering conduit 35, whose associated steering chamber 37 is connected with the return conduits 44, 6, and port B' of conduit 44.

An auxiliary valve 46 has a slide 46a which is shiftable between a neutral position, and two end positions. Valve slide 46a cooperates with ports C'' of two auxiliary conduits 57 and 58, and with a port B'' of pressure conduit 45. When the auxiliary valve slide 46a is shifted to the right as viewed in the drawing, the connections R'' cooperate with the stationary ports, and in the left end position of slide 46, the connections L'' cooperate with the stationary ports. Hydraulic shifting means 47 and 48, and springs 49, 50 are connected with the ends of slide 46, so that the same is held by a spring in the neutral position, but can be shifted by shifting means 47 and 48 between the two operative positions shifted to the left or right out of the neutral position. Conduits 51 and 52 are connected with the steering conduit 35 and 36 and through conduits 64 and 65, which include check valves 66 and 67, with the auxiliary conduits 57 and 58 which are connected with the steering chambers 59 and 60 of the auxiliary motor 61. Piston 40 of the steering motor 39 is connected by piston rod 41, and piston 62 of the auxiliary motor 60 is connected by piston rod 63 with the steering linkage 42 by which the wheels 43 are operated. Consequently, the movable pistons 40 and 62 move together during normal steering operations.

In the neutral position of the auxiliary valve 46, illustrated in FIG. 1, the connections N'' connect the auxiliary conduits 57 and 58 and thereby the second steering chambers 59 and 60 with each other, while port B'' of pressure conduit portion 45 is disconnected. In the left end position of auxiliary valve 56, the pressure conduit 3, 45 and port B'' are connected with auxiliary conduit 58, while auxiliary conduit 57 is disconnected in the region of the ports C''.

In the right end position of auxiliary valve 46, the connections R'' are effective, auxiliary conduit 58 is disconnected, and pressure conduit 6, 45 and port B'' are connected with port C'' of auxiliary conduit 57. Between safety valve 8 and throttle 4, a conduit 68 including a check valve 69 opening toward pressure conduit 3 are provided. Fluid from return conduit 6 can be sucked into pressure conduit 3 through check valve 69.

In the neutral position of control valve 5 illustrated in FIG. 1, pressure fluid displaced by power pump 1 flows through pressure conduit 3, and valve connections N directly into return conduit 6 and container 2. Control conduits 9 and 10, and steering conduits 35 and 36 are disconnected from the pressure and return conduits 3, 6. Control chamber 11 of steering pump 13, and the chamber of shifting means 31 are connected by control conduits 9 and 29, and valve connections 9' and steering conduit 36 with the first steering chamber 38, while correspondingly the control chamber 12 of steering pump 13, and the chamber of shifting means 32 acting on control valve slide 5 are connected by control conduits 10 and 30, the connections N' of control valve 5 and the steering conduit 35 with the first steering chamber 37 of the steering motor 39.

When the driver turns steering wheel 17 to displace piston 14 of control pump 13 into the control chamber 11, the pressure in control chamber 11 is increased, which results in an increased pressure in steering chamber 38 of steering motor 39. As long as only a small force is required for steering the car, the wheels 43 are turned due to the pressure differential between control chambers 11 and 12 of control pump 13, and the corresponding pressure differential between the first steering chambers 37, 38 of steering motor 39. Control valve slide 5a remains in its neutral position.

If the pressure in control chamber increases, the pressure in the hydraulic shifting means 31 is also increased so that slide 5a is shifted from the neutral position to the right to an operative position in which the connections R and R' are effective.

The control chamber 11 of control pump 13 remains connected by control conduit 9, valve connections R and R', and steering conduit 36 with steering chamber 38, but control chamber 12 is disconnected from the steering chamber 37 of steering motor 39, and connected by connections R of valve slide 5a with control conduit 10 and control chamber 11.

Consequently, pressure fluid from power pump 1 enters control chamber 12, and through the control conduit 30 also into the chamber of the hydraulic shifting means 32 which acts on control slide 5.

Control piston 14 is moved by the pressure fluid entering control chamber 12 farther into control chamber 11, so that the action of the steering wheel 17 and threaded spindle 16 on control piston 14 is boosted until the pressure acting in the chamber of shifting means 32 is so great that control valve slide 5a is returned to its neutral position.

Before this happens, the steering chamber 37 of steering motor 39 is connected by steering conduit 35 and connections R' of valve slide 5a, with port B' of return conduit 44, 6 so that pressure fluid flows out of steering chamber 37 into container 2.

The steering piston 40 is displaced into steering chamber 37 by the pressure force acting in steering chamber 38, and the wheels 43 are turned in the respective direction by the force provided by the pressure fluid in the steering motor 39.

Since the auxiliary conduits 51 and 52 of the auxiliary valve 46 are connected with steering conduits 35 and 36 which end in steering chambers 37 and 38, the pressure chamber of shifting means 47 is also connected with the return conduit means 44, 6, and consequently without pressure.

The pressure fluid acting in the chamber of the other shifting means 48 effects movement of auxiliary slide 46 to its left end position in which the pressure conduit means 45, 3 is connected with the auxiliary conduit 58 which leads to the steering chamber 60 of the auxiliary motor 61. Auxiliary piston 62 is moved into steering chamber 59, so that auxiliary motor 61 exerts a turning force on the wheels 43, supplementing the force exerted by the steering motor 39.

The fluid displaced out of steering chamber 59, flows through the auxiliary conduit 57, conduit 64, and check valve 66 into the steering conduit 35 which is connected with the return conduit means 44, 6.

When the desired turning angle of the wheel 43 is obtained, and the control valve slide 5a assumes again its neutral position, the control chamber 12 of control pump 13 is again disconnected from the pressure conduit means 3, and connected with the steering conduit 35 and the steering chamber 37. The chamber of the hydraulic shifting means 47 of auxiliary valve 46 is then also separated from the return conduit means 44, 6. Auxiliary valve slide 46a assumes again its neutral position, in which connections N and N' close the pressure conduit means 3, 45, and connect the steering chambers 59 and 60 of the auxiliary motor 61 with each other. When the steering wheel 17 is turned in the opposite direction, and control chamber 12 is contracted, the control valve 5 and auxiliary valve 46 are shifted in the opposite direction to the other operative position so that the steering of the wheels 43 is accomplished in the manner described above, but in the opposite direction.

If the wheels 43 are jolted in one direction by an irregularity of the road surface, the pressure in the first steering chamber 37 of the steering motor 39, and the pressure in the second steering chamber 59 of auxiliary motor 61, for example, increases so that the pressure in steering conduit 35, and in the respective chambers of shifting means 47 and 32 of auxiliary valve slide 46a and control valve slide 5a also increases. Auxiliary slide 46a is moved to its right end position in which the pressure conduit 45, 3 is connected with the auxiliary conduit 57, and pressure fluid is supplied to the second steering chamber 59 of the auxiliary motor 61. At the same time, control valve slide 5a assumes its left end position in which the pressure conduit 3 is connected with control conduits 9 and 29, while the control conduits 10 and 30 are disconnected. The steering conduit 35 remains connected with the control conduit 10 and with the control chamber 12 of the control pump 13, and the steering conduit 36 remains connected with the return conduit means 44, 6, so that fluid flows out of the first steering chamber 38 of steering motor 39 and out of the second steering chamber 60 of auxiliary motor 61. Consequently, pressure fluid is supplied to the second steering chamber 59 and discharged from the second steering chamber 60 of the auxiliary motor, whereby forces are exerted on the auxiliary piston 62 counteracting the force toward the left exerted on auxiliary piston 62 by the jolt of the wheels 43. In this manner, the jolt is damped, or completely compensated. When the pressure differential between the chambers of the hydraulic shifting means 31 and 32 of the control valve 5 is again zero, control valve slide 5a assumes its neutral position again. Both control conduits 9 and 10 are disconnected from the pressure and return conduits 3, 6 and connected with the steering conduits 35 and 36 which open into the first steering chambers 37 and 38.

The pressure differential between the chambers 47 and 48 of control valve slide 46a, becomes also zero, and springs 49 and 50 return the auxiliary valve slide 46a to its neutral position in which the pressure conduit means 3, 45 is closed, and the two auxiliary conduits 57 and 58, and thereby the second steering chambers 59 and 60 of auxiliary motor 61 are again connected with each other. Pistons 40 and 62 are then held in a position corresponding to the position of the steering wheel 17.

When very great jolts are exerted by wheels 43 on steering piston 40, the excess pressure valves 55 or 56 open toward the return conduit means 6, so that the pressure fluid can flow out of the first steering chambers 37 and 38 of the steering motor 39, and no damage is done to the mechanical parts of the apparatus.

Figure 2:
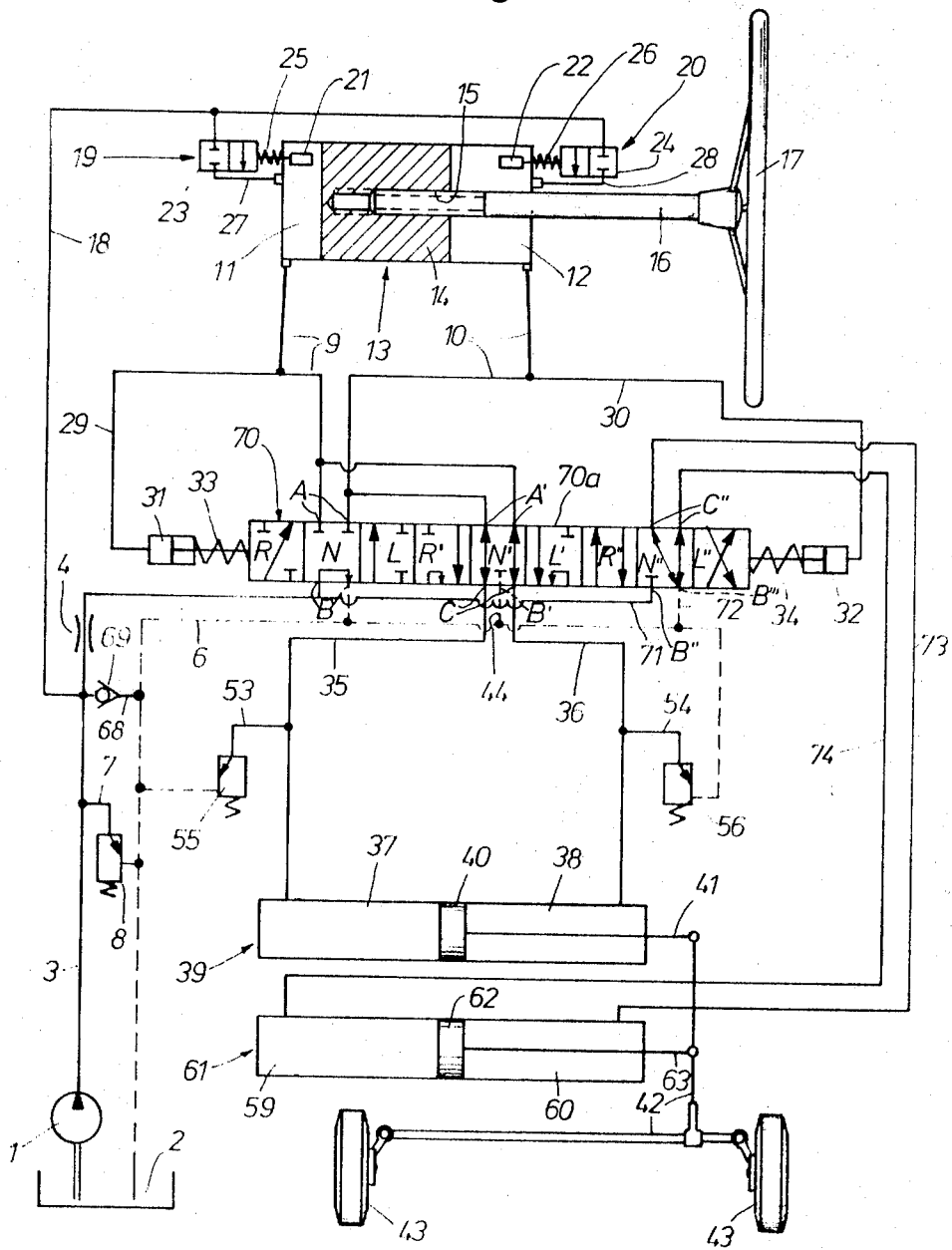
FIG. 2 is a schematic view illustrating a second embodiment of the invention, and including a diagram illustrating the hydraulic circuit of the same.

In the embodiment illustrated in FIG. 2, a control valve means 70 is provided which performs the function of the control valve 5 and of the auxiliary valve 46 of the embodiment of FIG. 1. Corresponding parts are indicated by like reference numerals in FIGS. 1 and 2. Control valve slide 70a is movable relative to ports A, A', B, C, and B' with connections R, N, L and R', N' and L'. Control valve slide 70a is also movable relative to ports C'' of two auxiliary conduits 73 and 74, to a port B'' of the pressure conduit 3, and to a port B' of return conduit 6 with three connections R'', N'' and L''. The connections R, N, L, R', N' and L' correspond to the connections of control valve slide 5a described with reference to FIG. 1, while the connections R'', N'' and L'' correspond to the auxiliary valve 46 of the embodiment of FIG. 1. Valve slide 70a cooperates with the ports A, B, C and A' in the manner explained with reference to FIG. 1. The portion R'', N'' and L'' controls the flow into and out of the auxiliary conduits 73 and 74 which are respectively connected with second steering chambers 60 and 59 of auxiliary motor 61.

In the neutral position, auxiliary conduits 73 and 74 are both connected with port B'' of conduit 72 of the return conduit means 6 so that the auxiliary piston 62 floats in the cylinder 60 of the auxiliary motor 61. In the neutral position of control slide 70, pressure conduit 71, 3 is closed.

When the driver turns the steering wheel 17 and displaces control piston 14 into control chamber 12, for example, the pressure in the control conduits 10 and 30, and in the chamber of the hydraulic shifting means 32 is increased, the valve slide 70a is moved to the left in which connections L, L' and L'' are effective. Control conduit 9, 29 is connected with the pressure conduit 3, and pressure fluid pumped by power pump 1 enters the control chamber 11, and the hydraulic shifting means 31. At the same time, pressure fluid flows through the pressure conduit portion 71 and port B" into the auxiliary conduit 74 through the respective port C", and into the steering chamber 59, while the steering chamber 60 is connected by auxiliary conduits 73 and 72 with the port B" of return conduit 6, 72. The steering chamber 38 of the steering motor 39 is also connected by conduits 36 and 44, and port B' with the return conduit 6, 44.

The steering chamber 37 is connected by the steering conduit 35 and the control conduit 10 with the control chamber 12 of control pump 13, so that pressure fluid displaced out of control chamber 12 enters the steering chamber 37 of steering motor 39.

Steering piston 40 is moved into a steering chamber 38 and shifts the linkage 42 with wheels 43. The movement of steering piston 40 is aided by the movement of auxiliary piston 62 into the steering chamber 60 of auxiliary motor 61, since the auxiliary piston 62 with piston rod 63 and steering linkage 42, with wheels 43, are displaced in the same direction as steering piston 40.

When the pressure differential between the control chambers 11 and 12 of control pump 13, and in the chambers of the hydraulic shifting means 31 and 32 becomes zero, since the hydraulic shifting means 31 and 32 are connected by control conduits 9, 29 and 10, 30, control slide 70a is moved back to its neutral position in which the pressure conduit 3 is directly connected with the return conduit 6 by the connections N. The control conduits 9 and 10 are connected with the steering conduits 35 and 36. The pressure conduit portion 71 is also disconnected, and the auxiliary conduits 73 and 74 are connected with the return conduit means 72, 6. Wheels 43 are angularly displaced in accordance with the turning angle of the steering wheel 17. The return of wheels 40 to a position for straight movement of the car, is carried out in a corresponding manner in the opposite direction.

In the event that jolts occur on the wheels 43, the pressure in one of the steering chambers of steering motor 39, for example in steering chamber 37, is increased, assuming that the pistons 40 and 62 move toward the left as viewed in FIG. 2. Pressure fluid enters the respective chamber of shifting means 32 through control conduit 30, and control slide 70a is shifted out of its neutral position to the left, so that the connections L, L', and L" become effective.

Pressure fluid is pumped by power pump 1 not only through the pressure conduit 3 into control conduits 9, 29 and into the chamber of the hydraulic shifting means 31, and into the control chamber 11 of control pump 13, but also flows through pressure conduit portion 71 and auxiliary conduit 74 into the steering chamber 59 of the auxiliary motor 61, and acts on the auxiliary piston 62 opposite to the direction in which it was displaced by the jolt so that the steering linkage 63, 42 is supported by auxiliary piston 62 and the jolt is either fully compensated, or at least damped. When the pressure differential between the hydraulic shifting means 31 and 32 of the control slide 70a is balanced, control slide 70a returns to its neutral position due to the action of the spring 33, 34, control chambers 11 and 12 of control pump 13 are again connected with the first steering chambers 37 and 38 of steering motor 39, while the second steering chambers 59 and 60 of the auxiliary motor 61 are then connected with the return conduit means 72, 6, and do not exert any pressure on the steering linkage.

It will be understood that each of the elements described above, or two or more together, may also find a useful application in other types of power steering apparatus differing from the types described above.

While the invention has been illustrated and described as embodied in a hydraulic power steering apparatus with an auxiliary steering motor for compensating jolts acting on the wheels of a steered motor car, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Hydraulic power steering apparatus, comprising, in combination, manually operated steering means including a control pump having two simultaneously expanding and contracting control chambers; motor driven power pump means; control valve means having a neutral position, and two operative positions associated with steering to the right and left; control conduit means connecting said control chambers with said control valve means; pressure and return conduit means connecting said power pump means and said control valve means; a hydraulic steering motor including a first movable member and two first steering chambers simultaneously expanding and contracting during movement of said first movable member; a steered element connected with said first movable member; steering conduit means connecting said first steering chambers with said control valve means so that manual operation of said steering means effects operation of said steering motor in said neutral position of said control valve means; shifting means connected with said control conduit means for shifting said control valve means from said neutral position to one or the other of said operative positions when the pressure in the respective control chamber increases, said control valve means connecting in each of said two operative positions said pressure and return conduit means with said steering conduit means and first steering chambers for power-operating said steering motor; a hydraulic auxiliary motor including a second movable member and two second steering chambers simultaneously expanding and contracting during movement of said second movable member, said second movable member being connected with said steered element and with said first movable member for movement with the same so that said first and second movable members move together when said steered element is jolted in one direction in said neutral position of said control valve means; and auxiliary conduit means connecting said control valve means with said second steering chambers so that when a pair of first and second steering chambers is contracted by a jolt on said steering element, said shifting means receive pressure fluid from one steering chamber of said pair of contracted first and second steering chambers for shifting said control valve means to one of said two operative positions for supplying pressure fluid from said pressure conduit means at least to said second steering chamber of said pair for urging said second movable member to move with said steered element opposite to the direction of the jolt.

2. Power steering apparatus as claimed in claim 1 wherein said control valve means include a control valve having a first neutral position and two first operative positions, and an auxiliary valve having a second neutral position and two second operative positions; wherein said shifting means include first hydraulic shifting means for shifting said control valve between said first neutral and operative positions, and being connected with said control conduit means, and second hydraulic shifting means for shifting said auxiliary valve between said second neutral and operative positions; wherein said control valve is connected with said control conduit means, said pressure and return conduit means, and said steering conduit means; wherein said auxiliary valve is connected with said auxiliary conduit means and with said pressure conduit means; wherein said auxiliary conduit means are connected with said steering conduit means and said second shifting means so that said auxiliary valve is shifted by said second shifting means in accordance with the pressure differential between said first steering chambers while said second steering chamber of said pair of first and second steering chambers is connected with said pressure conduit means.

3. Power steering apparatus as claimed in claim 2 wherein said auxiliary conduit means include two auxiliary conduits connected with said steering conduit means and with said second steering chambers, respectively, and being connected with each other by said auxiliary valve means in said second neutral position, and being, respectively, connected with said pressure conduit means, and with said return conduit means by said steering conduit means and said control valve, in said second operative positions of said auxiliary valve.

4. Power steering apparatus as claimed in claim 3 wherein said steering conduit means include two steering conduits connected with said first steering chambers, respectively; wherein said two auxiliary conduits include check valves, respectively, opening toward said steering conduits, respectively.

5. Power steering apparatus as claimed in claim 1 wherein said auxiliary conduit means are connected with said return conduit means in said neutral position of said control valve means, and are connected with said pressure and return conduit means in said two operative positions of said control valve means.

6. Power steering apparatus as claimed in claim 1 wherein said auxiliary conduit means include two auxiliary conduits connecting said second steering chambers with said control valve means; wherein said control valve means in said neutral position connects said two auxiliary conduits with said return conduit means, and connects in said operative positions said two auxiliary conduits with said pressure and return conduits, respectively; wherein said steering conduit means include two steering conduits respectively connected with said first steering chambers; wherein said control conduit means include two control conduits respectively connected with said two control chambers of said steering means; wherein said control valve means in said neutral position connects said steering conduits with said control conduits, and in said operative position connects one of said steering conduits with one of said control conduits and the other steering conduit with said return conduit means; and wherein said control valve means in said neutral position connects said pressure conduit means with said return conduit means, and in said operative positions connects said pressure conduit means with the other control conduit, respectively.

7. Power steering apparatus as claimed in claim 6 wherein said shifting means include first and second shifting means for moving said control valve to said operative positions, respectively; wherein said first and second shifting means are connected with said control conduits, respectively, so said equal pressure in said control chambers of said steering means causes movement of said control valve means to said neutral position whereby said auxiliary conduits are connected with said return conduit means; and wherein a pressure differential between said control chambers causes movement of said control valve means to one of said operative positions in which said auxiliary conduits are connected with said pressure and return conduits, respectively.

8. Power steering apparatus as claimed in claim 1 wherein said manually operated steering means includes a steering wheel, and a threaded spindle secured to the same for turning movement; wherein said control pump of said steering means includes a cylinder, and a control piston in said cylinder forming said control chambers on opposite sides of said control piston; wherein said control piston has a threaded bore meshing with said threaded spindle so that said control piston reduces and expands said control chambers when moved in said cylinder by turning said threaded spindle; and wherein said control conduit means include two control conduits connected with said control chambers, respectively, and said control valve means.

9. Power steering apparatus as claimed in claim 1 wherein said steering motor includes a cylinder and a steering piston connected with said steered element and being movable in said cylinder; and wherein said first steering chambers are formed by said steering piston on opposite sides of said steering piston.

10. Power steering apparatus as claimed in claim 1 wherein said auxiliary motor includes a cylinder and a damping piston connected with said steering element and being movable in said cylinder; and wherein said second steering chambers are formed by said damping piston on opposite sides of said damping piston.

* * * * *